US010790726B2

(12) United States Patent
Diemunsch

(10) Patent No.: US 10,790,726 B2
(45) Date of Patent: Sep. 29, 2020

(54) ELECTRICAL MACHINE COOLED BY A DUAL-FLOW IMPELLER

(71) Applicant: INSTITUT VEDECOM, Versailles (FR)

(72) Inventor: Guy Diemunsch, Fontaine (FR)

(73) Assignee: INSTITUT VEDECOM, Versailles (FR)

(*) Notice: Subject to any disclaimer, the term of this patent is extended or adjusted under 35 U.S.C. 154(b) by 0 days.

(21) Appl. No.: 16/334,225

(22) PCT Filed: Sep. 19, 2017

(86) PCT No.: PCT/FR2017/052513
§ 371 (c)(1),
(2) Date: Mar. 18, 2019

(87) PCT Pub. No.: WO2018/055285
PCT Pub. Date: Mar. 29, 2018

(65) Prior Publication Data
US 2019/0260267 A1 Aug. 22, 2019

(30) Foreign Application Priority Data

Sep. 21, 2016 (FR) .................................... 16 58870

(51) Int. Cl.
*H02K 9/04* (2006.01)
*H02K 9/06* (2006.01)
(Continued)

(52) U.S. Cl.
CPC ............. *H02K 9/06* (2013.01); *F04D 19/007* (2013.01); *F04D 25/08* (2013.01); *F04D 29/38* (2013.01);
(Continued)

(58) Field of Classification Search
CPC ...... H02K 9/04; H02K 9/06; H02K 1/27–2793
(Continued)

(56) References Cited

U.S. PATENT DOCUMENTS 5,780,946 A * 7/1998 Nakamura ............ F04D 25/082
310/58

FOREIGN PATENT DOCUMENTS

DE 102007006986 B3 6/2008
EP 2549624 A2 1/2013
(Continued)

OTHER PUBLICATIONS

Machine Translation, SANO, JP-2003219605-A, Jul. 2003. (Year: 2003).*
(Continued)

*Primary Examiner* — Thomas Truong
(74) *Attorney, Agent, or Firm* — Sandberg Phoenix & von Gontard, P.C.

(57) ABSTRACT

The invention relates to an assembly (1000) comprising an electrical machine (100) comprising: a stator (9) having windings forming coils (106), a rotor (103), a shaft (101) rotating the rotor (103), and an impeller (1) for cooling the electrical machine, said cooling impeller (1) comprising at least two crowns (2, 21, 22), including a first crown (21) and a second crown (22), each crown (2, 21, 22) comprising blades (3), the blades (3, 31) of the first crown (21) of the cooling impeller (1) being arranged so as to generate the circulation of a cooling fluid flow in a first direction (F1), and the blades (3, 32) of the second crown (22) being arranged so as to generate the circulation of the cooling fluid flow in a second direction (F2), the second direction (F2) opposing the first direction (F1). Said invention is applicable to motor vehicles.

16 Claims, 8 Drawing Sheets

(51) Int. Cl.
　　　*F04D 19/00*　　　(2006.01)
　　　*F04D 25/08*　　　(2006.01)
　　　*F04D 29/38*　　　(2006.01)
　　　*F04D 29/58*　　　(2006.01)
　　　*H02K 9/14*　　　(2006.01)
　　　*H02K 1/32*　　　(2006.01)

(52) U.S. Cl.
　　　CPC .............. *F04D 29/584* (2013.01); *H02K 9/04* (2013.01); *H02K 1/32* (2013.01); *H02K 9/14* (2013.01)

(58) Field of Classification Search
　　　USPC .............. 310/62, 63, 156.08, 156.11, 156.12
　　　See application file for complete search history.

(56) References Cited

FOREIGN PATENT DOCUMENTS

| | | | |
|---|---|---|---|
| JP | 2003219605 A | * | 7/2003 |
| JP | 2003219605 A | | 7/2003 |

OTHER PUBLICATIONS

International Search Report for PCT/FR2017/052513 dated Jan. 22, 2018.
Written Opinion for PCT/FR2017/052513 dated Jan. 22, 2018.

* cited by examiner

ELECTRICAL MACHINE COOLED BY A DUAL-FLOW IMPELLER

CROSS-REFERENCE TO RELATED APPLICATIONS

This application is the US National Stage under 35 USC § 371 of International Application No. PCT/FR2017/052513, filed Sep. 19, 2017 which claims priority to French application 1658870 filed on Sep. 21, 2016, the content of which (text, drawings and claims) is incorporated herein by reference.

BACKGROUND

The field of the present invention is that of electrical machines, preferably rotary electrical machines, such as generators or motors. More particularly, these electrical machines are intended to be installed in vehicles, in particular automobiles, such as road vehicles or trains.

The rotary electrical machines, such as generators or motors, comprise a stator and a rotor. Windings forming coils are mounted on the stator, and, for example, permanent magnets are fastened to the rotor. The rotor is rotatable via a shaft. When the electrical machine is a generator, the rotating movement of the rotor opposite the coils of the stator makes it possible to generate electrical energy, and when the electrical machine is a motor, the rotation of the rotor generates mechanical energy.

In the case where these electrical machines are used to set an electric vehicle in motion, the weight of all of the elements on board the vehicle should be minimized, since this weight has a direct impact on the autonomy of a power source responsible for supplying the electrical machine propelling the vehicle. This effort to reduce weight is reflected by an optimization of the compactness of this electrical machine, while keeping the same performance level.

This situation leads to an increase in the heat density produced by the electrical machine, which may affect the magnetization of the rotor. It should therefore be cooled in order to avoid overheating that could cause a reduction in performance, breaking of certain components, or even destruction of the electrical machine.

The components of the electrical machine to be cooled include the coils, and more particularly the coil heads, as well as the sheet metal forming the stator and the rotor. The same is true for the small space existing between the rotor and the stator, called the air gap. These components are critical elements, which dimension the general performance of the electrical machine. Bearing in mind this reduction in the size of the electrical machine, it becomes particularly difficult to cool these components efficiently.

It is known to cool an electrical machine using a forced circulation flow. Such circulation is done using an impeller providing cooling of a rotary machine. However, these impellers do not allow sufficient mixing and optimal flow rate of the flow circulating in the electrical machine.

SUMMARY

The invention aims to resolve one of the preceding technical problems at least partially. To that end, the invention proposes an assembly comprising (i) an electrical machine comprising a stator having windings forming coils, a rotor, and a shaft rotating the rotor, and (ii) an impeller for cooling the electrical machine, the cooling impeller comprising at least two crowns, including a first crown and a second crown, each crown comprising vanes. The vanes of the first crown of the cooling impeller are arranged so as to generate a circulation of a cooling fluid flow in a first direction, and the vanes of the second crown are arranged so as to generate the circulation of the cooling fluid flow in a second direction, the second direction being opposite the first direction.

Thus, the assembly makes it possible to generate an air flow providing a good circulation of the cooling fluid inside the electrical machine and therefore allowing improved cooling. Non-limitingly, the cooling fluid is advantageously air. This improved cooling is the result of an optimal mixing of the cooling fluid and an increased cooling fluid flow rate inside the electrical machine to be cooled.

"Opposite directions" for example means that the first direction moves away from the cooling impeller while the second direction comes closer to the cooling impeller, or vice versa.

According to different features of the invention considered alone or in combination, it is possible to provide that:
  the cooling impeller comprises more vanes on the second crown than there are vanes on the first crown, which in particular makes it possible to improve the movement of the cooling fluid;
  the cooling impeller comprises at least one ring connecting the first crown and the second crown and defining an outer face of the first crown and an inner face of the second crown;
  the first crown of the cooling impeller comprises:
  a first ring defining an inner face of the first crown,
  a second ring defining an outer face of the first crown,
  a plurality of vanes arranged between the first ring and the second ring;
  the second crown of the cooling impeller comprises:
  a second ring defining an inner face of the second crown,
  a third ring defining an outer face of the second crown,
  a plurality of vanes arranged between the second ring and the third ring;
  the second ring is shared by the first crown and the second crown of the cooling impeller;
  the first crown of the cooling impeller has an average radius smaller than an average radius of the second crown of the cooling impeller. The average radius of a crown is equal to the average of the radii of the inner face and the outer face of the crown;
  a plane passes through all of the crowns of the cooling impeller. In other words, this means that the crowns are arranged radially above one another, while being contained in the plane of the cooling impeller;
  the cooling impeller comprises a hub defining an inner face of the first crown;
  at least one connecting arm connects the hub to the first crown of the cooling impeller;
  each crown has a same thickness along a rotation axis of the cooling impeller;
  at least one vane of the cooling impeller comprises a first end having a rounded shape;
  at least one vane of the cooling impeller comprises a second end having a pointed shape;
  the vane(s) of the cooling impeller become gradually thinner between the first and second ends;
  at least one vane of the cooling impeller has a curve along an elongation axis of the vane. It will be noted that the curve of the vanes of the first crown is different from the curve of the vanes of the second crown. According to one embodiment, a radius defining the curve of the vanes of the first crown is smaller than a radius defining the curve of the vanes of the second crown;

the vanes of the first crown of the cooling impeller extend in a vertical plane secant at a point to a vertical plane in which the vanes of the second crown extend;

the cooling impeller is configured to suction and propel the cooling fluid in a direction parallel to a rotation axis around which the cooling impeller rotates;

according to a first alternative embodiment, the cooling impeller is rotatably coupled to the electrical machine. According to a second alternative embodiment, the cooling impeller is rotatably uncoupled from the electrical machine;

the cooling impeller is independent of the shaft rotating the rotor. In other words, the impeller is not rotatably coupled to the electrical machine. Thus, the speed at which the electrical machine rotates does not influence the speed at which the cooling impeller rotates, which makes it possible to discharge the heat generated by the electrical machine when it rotates at a low speed;

the cooling impeller is configured to be rotated by an electrical actuator independent from the electrical machine. Independent means that the electrical actuator is mechanically independent of the electrical machine;

the independent electrical actuator is fastened on a flange of the electrical machine;

the cooling impeller is arranged so as to generate a circulation of a cooling fluid in a circulation direction in an air gap located between the rotor and the stator of the electrical machine;

the cooling impeller is arranged so as to generate a circulation of a cooling fluid in a circulation direction along an outer face of the stator;

the outer face of the stator comprises cooling fins;

the cooling impeller is located on a longitudinal end of the electrical machine;

the electrical machine comprises a jacket in which the stator and the rotor are placed, the cooling impeller being placed at a longitudinal end of the jacket. It is in particular understood here that the outer ring of the cooling impeller is in the longitudinal extension of a wall forming the jacket;

the assembly comprises a space situated between the jacket and one end of the cooling fins able to be traveled by the cooling fluid;

the cooling impeller is arranged so as to generate a circulation of a cooling fluid in a circulation direction in a space situated between the rotor and the shaft configured to rotate the rotor, and more particularly at a notch or notches arranged at the rotor, opposite the shaft;

the cooling impeller is arranged so as to generate a circulation of a cooling fluid in a circulation direction inside the shaft configured to rotate the rotor, the shaft being hollow;

the electrical machine shaft is arranged to be inserted into a portion of an inner cavity of the rotor, the rotor comprising, in an outer zone, at least one magnetic element generating an electromagnetic flux, the inner cavity of the rotor being delimited by at least two adjacent notches separated from one another by a contact portion configured to bear on the shaft, at least part of a wall delimiting the notches respecting the electromagnetic flux generated by the magnetic element. Thus, the notches formed on the rotor make it possible both to create a cooling fluid passage between the rotor and the shaft of the electrical machine and also make it possible to lighten the rotor. The cooling fluid passage allows cooling by forced convection of the rotor and the shaft of the electrical machine. Two notches are said to be adjacent when they are separated only by a single contact portion. The contact portions make it possible to ensure that the rotor stays in contact with the shaft of the electrical machine and allow the transmission of the rotational movement. The concept of "respecting the electromagnetic flux" means that the portion of the wall follows a profile seen in section identical or similar to a magnetic flux line generated by the magnetic element. This portion therefore does not intersect the electromagnetic flux lines. According to one example embodiment, the wall portion that respects the electromagnetic flux is curved in a plane perpendicular to a rotation axis of the rotor;

the wall delimiting the notches extends in a plane perpendicular to a rotation axis of the rotor;

the rotor is formed by an assembly of rotor sheets, each rotor sheet comprising the portion of the wall respecting the electromagnetic flux and delimiting the notches;

each notch has a concave curved shape seen from a rotation axis of the rotor;

the contact portion has a convex circular shape seen from a rotation axis of the rotor;

the notches are regularly angularly distributed. More specifically, a constant angular sector between two adjacent notches is equal to 360/P, where P corresponds to the total number of magnetic elements;

an angular interval between the notches and the contact portions is constant. More specifically, the constant angular interval between the notches and the contact portions is equal to 360/2P, where P corresponds to the total number of magnetic elements. Thus, for eight magnetic elements, the constant angular interval between the notches and the contact portions is equal to 22.5 degrees relative to a rotation axis of the rotor. This then means that the rotor has eight notches every 45 degrees and eight contact portions every 45 degrees. The angular sector is measured between a first radius of the rotor passing through an apex of the first notch and a second radius of the rotor passing through an apex of the second notch. The angular interval is measured between a radius of the rotor passing through an apex of the notch and a radius of the rotor passing through a center of symmetry of the contact portion;

a radius of the rotor passing through a center of the magnetic element also passes through a point of the notch furthest from a rotation axis of the rotor. Thus, one ensures that the magnetic elements are aligned with the notches. The point of the notch furthest from the rotation axis can also be called apex of the notch. When the notch has a plane of symmetry, in particular longitudinal, the radius of the rotor can also pass through the center of the magnetic element and through the longitudinal plane of symmetry of the notch;

two adjacent magnetic elements, each having a north radial polarity and a south radial polarity, are positioned on the rotor such that their polarities are reversed relative to one another. Two magnetic elements are said to be adjacent when they are each in the immediate vicinity of the other. The reversed polarities mean that if a given magnetic element has a north outer radial polarity and a south inner radial polarity, then the adjacent magnetic element has a south outer radial polarity and a north inner radial polarity.

each notch has a rounded apex. The apex of the notch corresponds to the point furthest from the rotation axis and can also correspond to the point closest to the magnetic element;

the shaft comprises grooves for cooperating with the contact portions of the rotor;

the grooves extend parallel to a rotation axis of the rotor.

Various embodiments of the invention are provided, incorporating the various optional features described here according to all possible combinations thereof.

DESCRIPTION OF THE FIGURES

Other features and advantages of the invention will also appear in the following description on the one hand, and several exemplary embodiments provided for information and non-limitingly in reference to the appended schematic drawings on the other hand, in which.

Of course, the features, variants and different embodiments of the invention can be associated with one another, in various combinations, as long as they are not incompatible or mutually exclusive. It is in particular possible to imagine variants of the invention comprising only a selection of the features described hereinafter isolated from other described features, if the selection of features is sufficient to impart a technical advantage or to differentiate the invention from the prior art.

In particular, all of the variants and all of the embodiments described are able to be combined if nothing precludes this combination technically speaking.

In the FIGURES, the elements shared by several FIGURES keep the same references.

DETAILED DESCRIPTION

Figure 9:
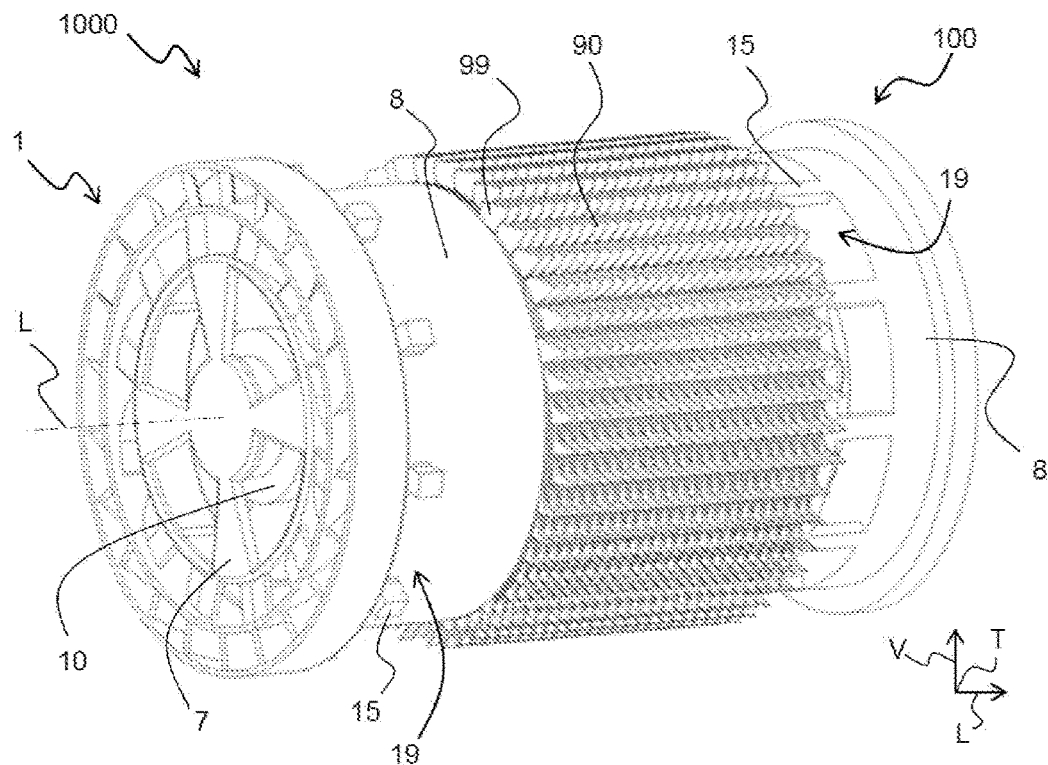
FIG. 9 is a perspective view of an assembly and in which the electrical machine is shown without its jacket and with the cooling impeller illustrated in FIG. 1.

In the following description, the relative concepts such as "inner" or "outer" are defined with respect to a rotation axis R defined as the axis around which the cooling impeller rotates. The concept of "inner" according to this coordinate system means that the considered element is located or oriented radially toward the inside of the cooling impeller, while the notion of "outer" according to this coordinate system means that the considered element is located or oriented radially toward the outside of the cooling impeller. A longitudinal axis L is defined as the axis along which the electrical machine extends in its length, the longitudinal axis L and the rotation axis R being combined when the assembly is formed. In the following description, we will also refer to an orientation as a function of the longitudinal L, vertical V and transverse T axes, as they are defined arbitrarily by the trihedron L, V, T shown in FIGS. 1, 2 and 9. The choice of the names of these axes is not limiting with respect to the orientation that the impeller may assume in its application to a motor vehicle.

Figure 1:
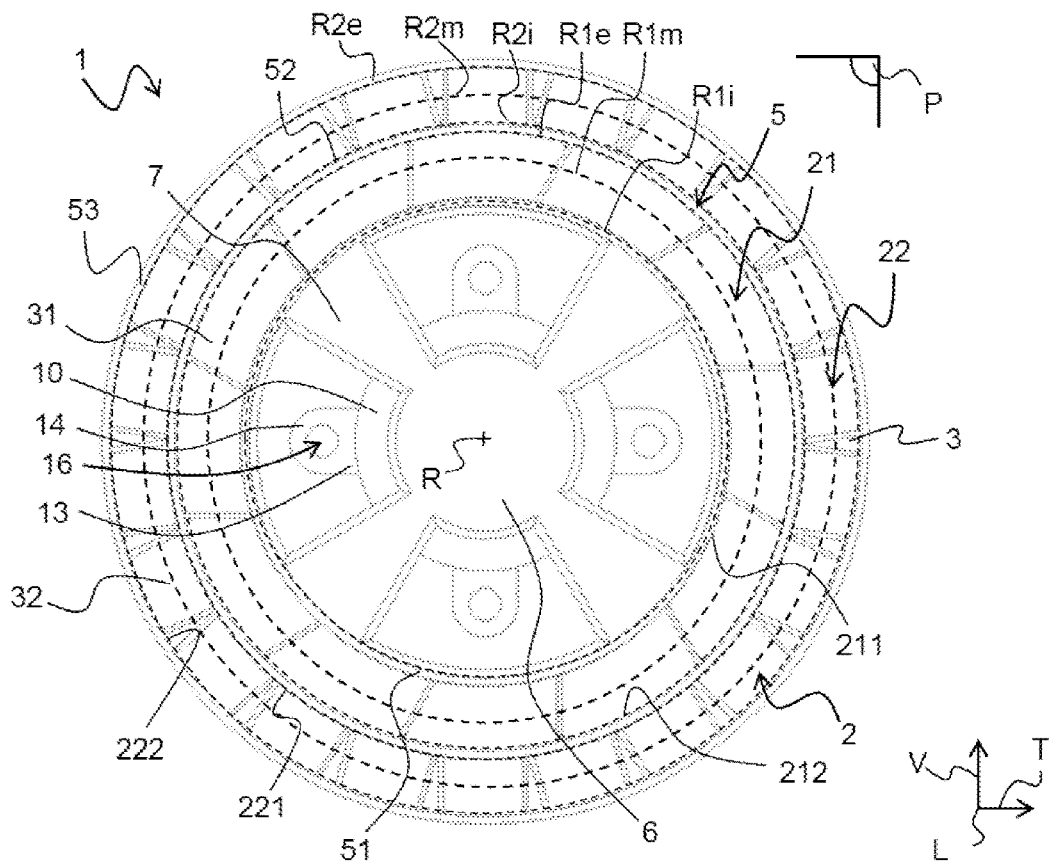
FIG. 1 is a front view of a cooling impeller of the assembly, set in motion by an independent electrical actuator.

FIG. 1 shows a cooling impeller 1 intended to cool an electrical machine. This cooling impeller 1 is rotatable around a rotation axis R. The cooling impeller 1 comprises at least two crowns 2, including a first crown 21 and a second crown 22, each crown 2 comprising vanes 3. For greater clarity, in the remainder of the description, the vanes of the first crown 21 will be called first vanes 31 and the vanes of the second crown 22 will be called second vanes 32. The cooling impeller 1 extends radially in a plane P and the crowns 2 are arranged above one another in the same plane P of the cooling impeller. In other words, the crowns 2, 21, 22 of the cooling impeller 1 are coaxial along the rotation axis R.

The cooling impeller 1 comprises rings 5 making it possible to separate each crown 2. It should be noted that each ring 5 extends along its largest dimension along the rotation axis R of the cooling impeller 1. In other words, the largest dimension of each ring 5 is perpendicular to the vanes 3 of the cooling impeller 1. More particularly, the first crown 21 comprises a first ring 51, also called inner ring, defining an inner face 211 of the first crown 21. The first crown 21 comprises a second ring 52, also called intermediate ring, defining an outer face 212 of the first crown 21. The vanes 3 of first crown 21 are then arranged radially between the first ring 51 and the second ring 52.

In the same way, the second crown 22 comprises the second ring 52, called intermediate ring, defining an inner face 221 of the second crown 22. The second crown 22 comprises a third ring 53, called outer ring, defining an outer face 222 of the second crown 22. The vanes 3 of the second crown 21 are then arranged radially between the second ring 52 and the third ring 53.

Here, the cooling impeller 1 comprises only two crowns, thus the intermediate ring 52 between the first crown 21 and the second crown 22 defines both the outer face 212 of the first crown 21 and the inner face 221 of the second crown 22.

FIG. 1 also shows that each crown 2 has an average radius. The average radius is defined as the average between the radius of the inner face and the radius of the outer face for a same crown. Thus, the first crown 21 has an inner radius R1$i$, an outer radius R1$e$ and an average radius R1$m$. The same is true for the second crown 22 with its inner radius R2$i$, its outer radius R2$e$ and its average radius R2$m$. It will then be noted that the first crown 21 has an average radius R1$m$ smaller than the average radius R2$m$ of the second crown 22.

Furthermore, the cooling impeller 1 comprises a hub 6 intended to cooperate with the shaft making it possible to rotate the cooling impeller 1. The hub then defines the inner face 211 of the first crown 21. The hub 6 includes, on one of its faces, connecting arms 7 connecting the hub 6 to the first crown 21. These connecting arms 7 are oriented in the direction of the stresses and here extend radially relative to the cooling impeller 1. The connecting arms 7 then make it possible to transmit the rotational movement from the hub 6 to the crowns 2, 21, 22.

It should be noted that the hub 6 extends in a plane perpendicular to the rotation axis R of the cooling impeller 1 and passing through the set of vanes 3 of the cooling impeller 1. One thus ensures that the bulk of the cooling impeller 1 is optimized. More generally, one can say that the hub 6 extends in a plane perpendicular to the rotation axis R of the cooling impeller and passes through at least one of the vanes 3 of the cooling impeller 1.

Figure 2:
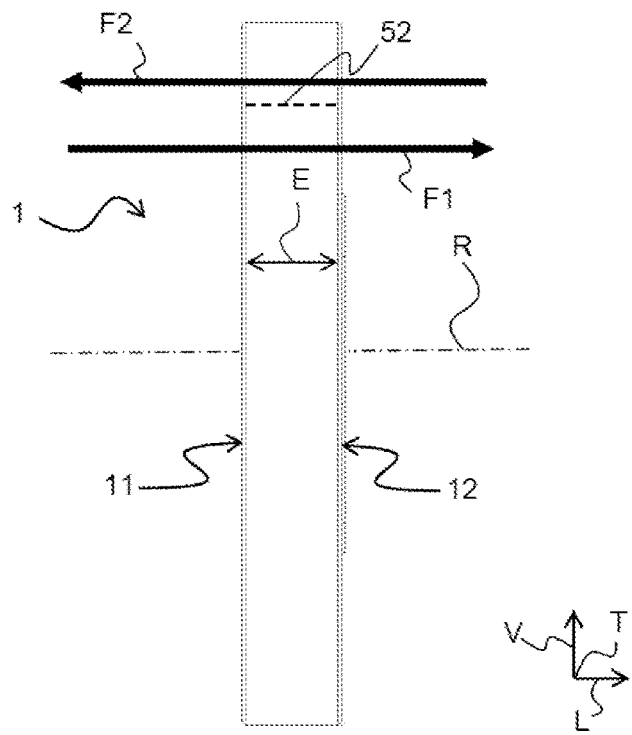
FIG. 2 is a side view of the cooling impeller illustrated in FIG. 1.

Furthermore, as shown in FIG. 2, the cooling impeller 1 preferably keeps the same thickness E, measured along the rotation axis R of the cooling impeller 1. The cooling impeller 1 preferably has a single suction eye, i.e., it contains only one wheel including the crowns placed radially above one another. The notion of single suction eye is for example opposed to a double suction eye impeller that includes two wheels alongside one another along the rotation axis R and having only one hub. Furthermore, FIG. 2 also shows that the cooling impeller 1 generates a flow of cooling fluid in two opposite directions F1, F2. It will be noted that the fluid is suctioned and propelled parallel to the rotation axis R of the cooling impeller 1, thus the impeller is said to be of the axial or helical type. The axial or helical impellers are opposed to radial or centrifugal impellers, for which the fluid is suctioned parallel to the rotation axis R and is propelled perpendicular to this same axis R.

Figure 3:
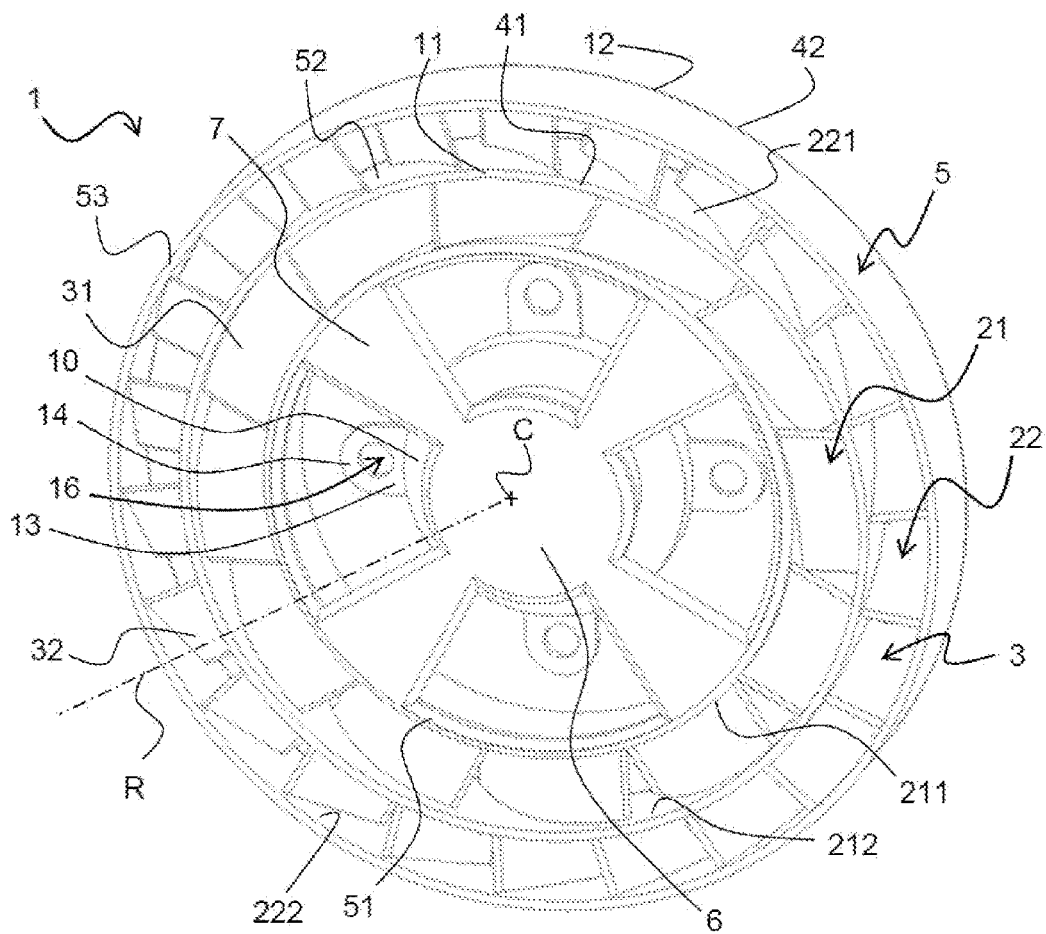
FIG. 3 is a perspective view of the cooling impeller illustrated in FIG. 1.

FIG. 3 shows the cooling impeller 1 in perspective view. The cooling impeller 1 then comprises a first face 11 and a second face 12. More specifically, the faces 11, 12 are defined in planes passing through end edges that axially delimit the rings 5, 51, 52, 53. The first face 11 here is defined as the plane comprising both the connecting arms 7 and the first end edges 41 forming the rings 5, 51, 52, 53. The second face 12 is in turn defined as that intended to receive a shaft making it possible to rotate the cooling impeller 1, the second face 12 comprising the second end edges 42 forming the rings 5, 51, 52, 53 and situated opposite the first end edges 41.

The vanes 3 of the first crown 21, called first vanes 31, are arranged so as to generate a circulation of a cooling fluid in a first circulation direction F1 and the vanes 3 of the second crown 22, called second vanes 32, are arranged so as to generate the circulation of the cooling fluid in a second circulation direction F2, the second direction F2 being opposite the first direction F1. "Opposite direction" for example means that the first direction F1 moves away from the cooling impeller while the second direction F2 comes closer to the cooling impeller, or vice versa. It is observed that for a same crown 2, the vanes 3 are diametrically opposite relative to the rotation axis R of the cooling impeller 1.

Furthermore, the cooling fluid can be either a liquid or a gas. Non-limitingly, the following description considers that the cooling fluid here is air.

Figure 4:
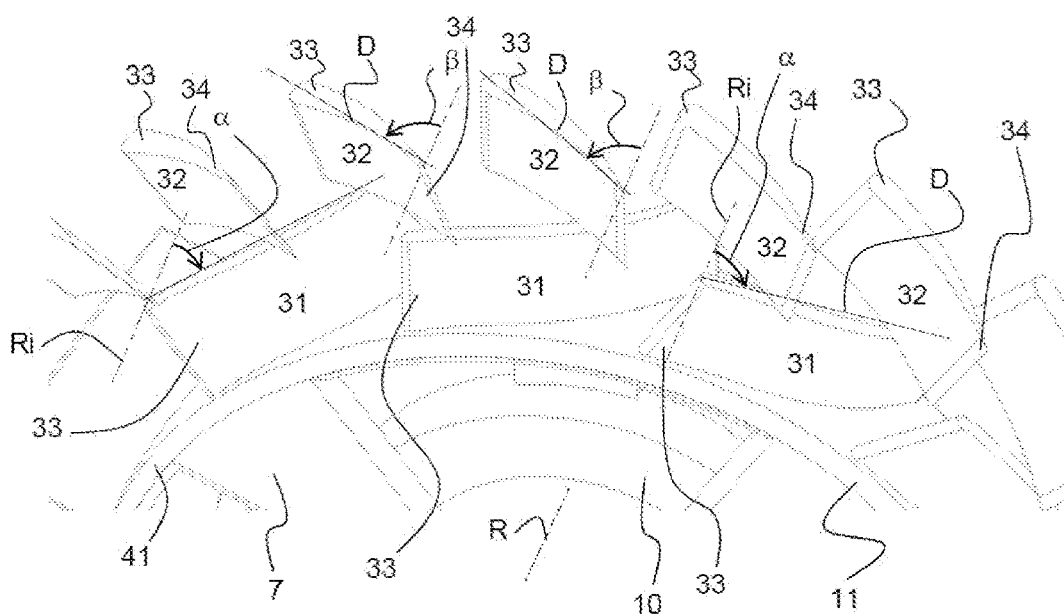
FIG. 4 is a partial perspective view of the vanes of the cooling impeller illustrated in FIG. 1.
Figure 5:
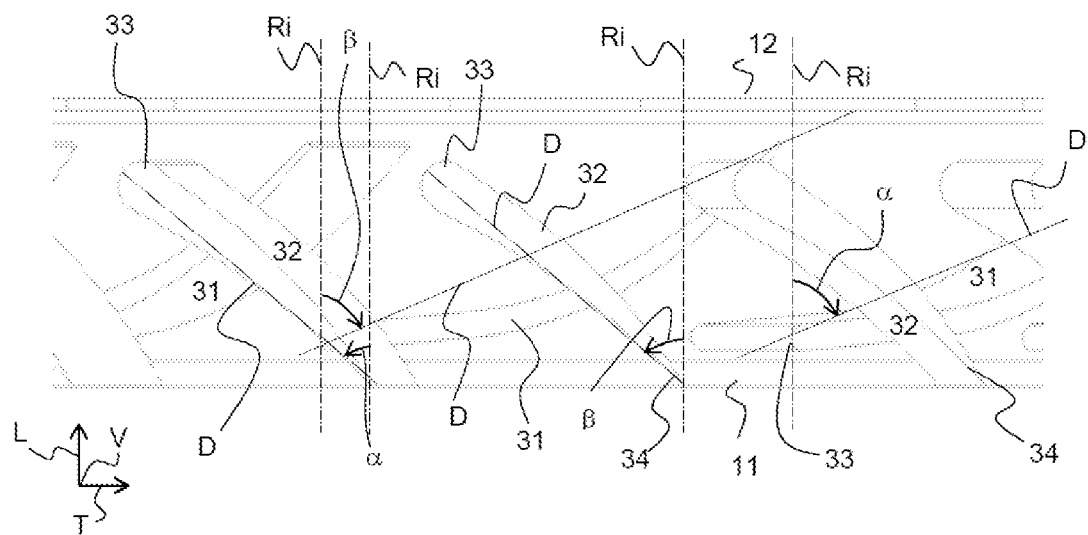
FIG. 5 is a partial top view of the cooling impeller illustrated in FIG. 1 and shown without its rings.

As illustrated by FIGS. 4 and 5, each vane 3 can assume the form of a curved blade. Here, the blade is for example rectangular and has at least one long edge and at least one short edge. The short edge is defined by longitudinal ends 33, 34 of the vane 3 and the long edge is defined by a contact zone between the vane and one of the rings 5, 51-53. It is noted that each vane 3 comprises a first longitudinal end 33 and the second longitudinal end 34. These ends 33, 34 delimit the height of the rectangle encircling the vane 3, 31, 32. Non-limitingly, the first end 33 is rounded and the second end 34 is pointed. Such ends 33, 34 make it possible to optimize the aerodynamism and the movement of the air. The vanes 3, 31, 32 comprising the rounded and pointed ends 33, 34 then have an inner face and an outer face becoming gradually thinner as it approaches the pointed second end 34.

From one crown to the other, these ends 33, 34 are arranged in opposition relative to one another, i.e., the rounded ends 33 of the first vanes 31 are for example oriented toward, or even arranged on, the first face 11 of the cooling impeller 1 while the rounded ends 33 of the second vanes 32 are oriented toward, or even arranged on, the second face 12 of the cooling impeller 1.

FIG. 5 shows a partial top view of the first vanes 31 and the second vanes 32 of the cooling impeller shown without referenced rings 5, 51, 52, 53. Each vane 3, 31, 32 has a reference line D passing through each of the two longitudinal ends 33, 34 of the vane 3, 31, 32, on a same face of the vane 3. Starting from the first face 11 of the cooling impeller 1, the vanes 31, 32 and the reference lines D are arranged obliquely relative to the rotation axis R of the cooling impeller 1 or relative to lines Ri parallel to the rotation axis R. Obliquely means that the vanes 3 are not parallel or perpendicular relative to the rotation axis R of the cooling impeller 1 and the lines Ri parallel to the rotation axis R. More specifically, taking the first end 33 of a first vane 31 oriented toward the first face 11 of the cooling impeller 1, the reference line D of the first vane 31 then forms a first angle $\alpha$ with the parallel line Ri. Taking the second end 34 of a second vane 32 oriented toward the first face 11 of the cooling impeller, the reference line D of the second vane 32 then forms a second angle $\beta$ with the parallel line Ri. It will then be noted that the first angle $\alpha$ is in a clockwise direction relative to the parallel line Ri while the second angle $\beta$ is in a counterclockwise direction relative to the parallel line Ri. In other words, the first angle $\alpha$ has a negative value, while the second angle $\beta$ has a positive value. More generally, it is possible to conclude that the planes in which the first vanes 31 and the second vanes 32 extend vertically intersect. It should be specified that the planes in which the first vanes 31 and the second vanes 32 extend vertically are not combined.

Figure 6:
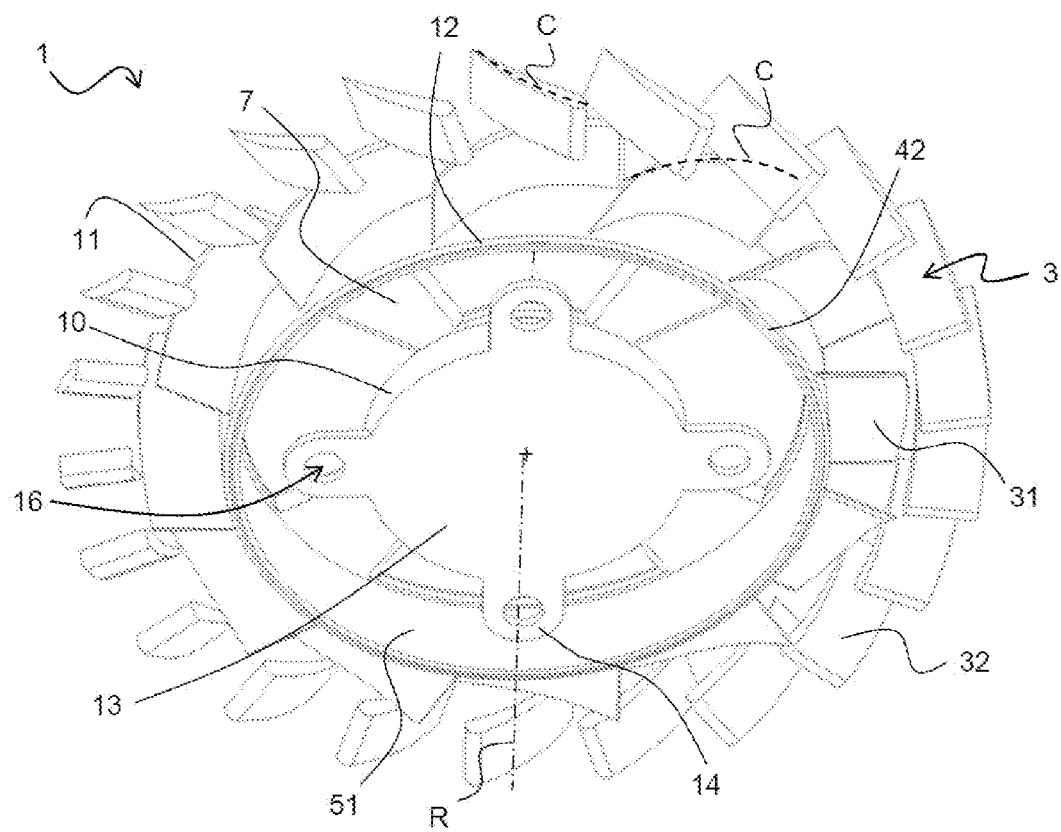
FIG. 6 is a perspective view of the cooling impeller along its second face and without its rings.

Furthermore, the vanes 3, 31, 32 have a curvature C (cf. FIG. 6) along their elongation axis. The curvature C extends from the first end of the vane 3, 31, 32 to the other end 34. More specifically, starting from the end 33, 34 situated as close as possible to the first face 11 of the cooling impeller 1, the curvature C of the vane is in a counterclockwise direction for the first vanes 31 and in a clockwise direction for the second vanes 32.

Furthermore, the first crown 21 comprises fewer vanes 3 than the second crown 22. Indeed, in the exemplary embodiment shown in FIG. 6, the first crown 21 comprises twelve vanes 31 and the second crown 22 comprises twenty-two vanes 32. More specifically, the first crown 21 comprises a vane 31 every thirty degrees and the second crown 22 comprises a vane 32 about every 17 degrees.

The cooling impeller 1 is preferably manufactured by molding. More specifically, the vanes 3, 31, 32, the rings 5, 51, 52, 53, the hub 6 and the connecting arms are all made by molding during a same molding step. Thus, the cooling impeller 1 is a single piece.

Furthermore, the cooling impeller 1 can be rotated by an electrical actuator 10. This electrical actuator 10 is mechanically independent from an electrical machine which the cooling impeller 1 cools. The electrical actuator 10 is situated at the hub 6 of the cooling impeller 1 and more specifically on the second face 12 of the cooling impeller 1. The electrical actuator 10 of the cooling impeller 1 comprises, on the face opposite the cooling impeller 1, a fastening support 13 for example allowing fastening to the electrical machine. This fastening support 13 is embodied here by fastening tabs 14 comprising at least one orifice 16 able to allow a fastening means to pass. The fastening means may for example be a screw or a rivet. Thus, the fastening support 13 is intended to secure the cooling impeller thus formed on a rotary machine needing cooling. In the exemplary embodiment shown in FIGS. 1 to 6, the fastening support 13 comprises four fastening tabs 14 distributed angularly at 90° and each comprising an orifice 16. According to one alternative, the electrical actuator 10 of the cooling impeller 1 could be fastened by gluing or by any other means capable of securing the electrical actuator 10 on a support.

Figure 7:
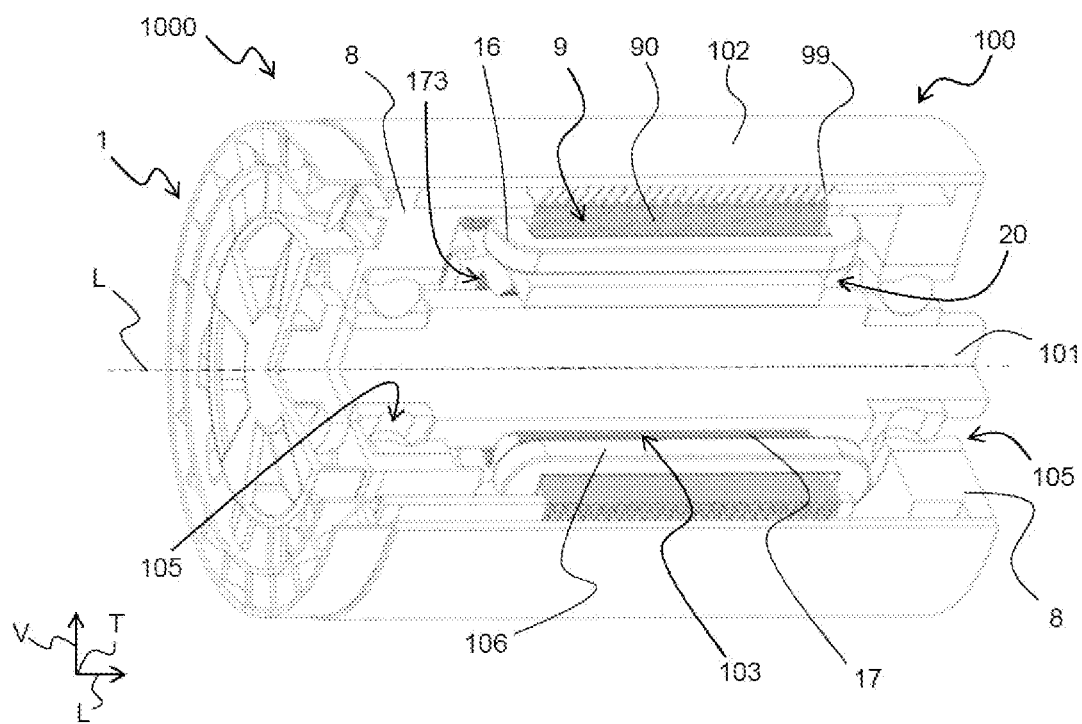
FIG. 7 is a perspective and partial sectional view of an assembly comprising an electrical machine and the cooling impeller of FIG. 1, in particular.

An assembly 1000 comprising an electrical machine 100 and the cooling impeller 1 as previously described is visible in FIG. 7. The cooling impeller 1 is intended to cool the electrical machine 100 by suctioning and propelling a cooling fluid, preferably gaseous, in various cooling fluid passages arranged in the electrical machine 100. The cooling fluid is for example air.

It should be noted that the air entering through the cooling impeller 1 is air outside the electrical machine 100, while the air leaving through the cooling impeller is air inside the electrical machine 100. Indeed, the electrical machine shown in FIG. 7 is a so-called open machine, i.e., exposed to the air outside it. It will also be specified that the electrical machine 100, described below, comprises a single cooling circuit, in particular by outside air. In other words, the electrical machine 100 is only cooled by air.

The electrical machine 100 comprises a stator 9 as well as a shaft 101 rotating a rotor 103. An air gap 20 arranged between the stator 9 and the rotor 103 forms a first cooling fluid passage in the electrical machine 100.

The stator 9 can be made by a stack of sheets 90 on which windings forming a plurality of coils 106 are mounted. The coils 106 have coil heads 16 and each coil head 16 protrudes longitudinally from the stack of metal sheets 90 of the stator 9, along the longitudinal axis L of the electrical machine 100. Each metal sheet 90 of the stator 9 can optionally comprise at least one cooling fin 99 derived from its outer periphery and thus allowing cooling of the outer face of the stator 9.

The rotor 103 can also be made by a stack of metal sheets 17 on which permanent magnets are for example mounted. The rotor 103 can also be wound or molded. The metal sheets 17 of the rotor 103 may comprise one or several notches 173 on their central portion so as to create at least a second cooling fluid passage between the rotor 103 and its rotation shaft 101.

The assembly 1000 advantageously comprises at least one cooling fluid passage between the rotor 103 and the shaft 101 of the electrical machine 100, the cooling impeller 1 being secured to the electrical machine 100 or independent therefrom, according to the embodiments previously described. An example embodiment of such a cooling fluid passage between the rotor 103 and the shaft 101 of the electrical machine 100 will be described in more detail in reference to FIGS. 13 and 14.

Furthermore, the electrical machine 100 may comprise at least one flange 8 arranged at a longitudinal end of the stator 9. In the example illustrated here, the electrical machine 100 comprises two flanges 8 each arranged at a longitudinal end of the stator 9. Each flange 8 makes it possible to keep the shaft 101 rotating the rotor 103 via a rotation bearing 105, for example a ball bearing.

Figure 8:
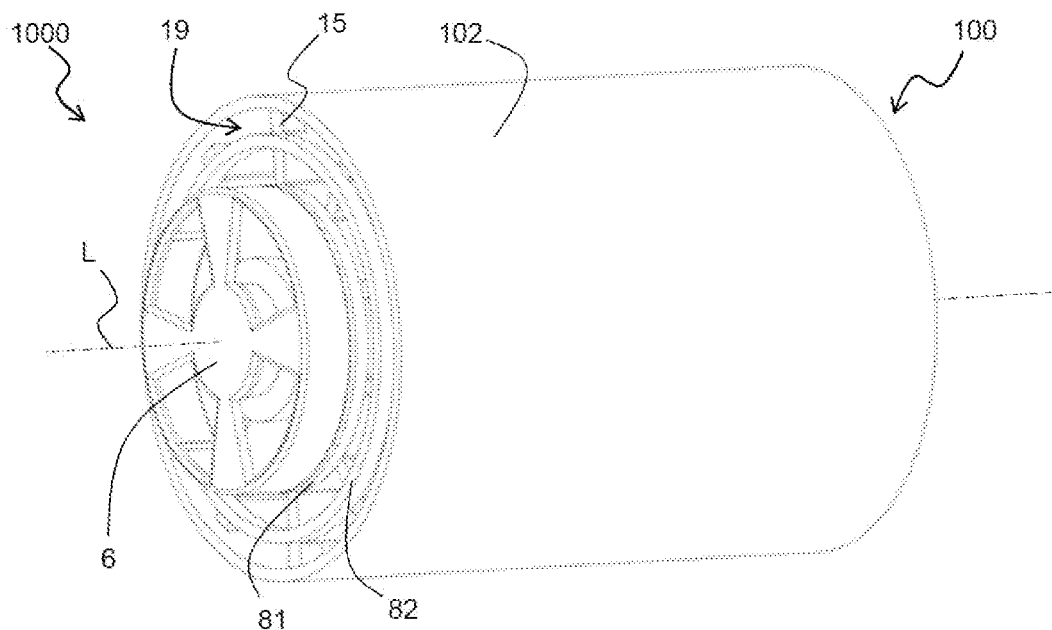
FIG. 8 is a perspective view of an assembly and in which the electrical machine comprises a jacket.

FIG. 8 shows that the electrical machine 100 preferably comprises a jacket 102 covering the flanges 8 and the stator 9. The covering is done along a longitudinal axis L in which the electrical machine 100 extends. When the electrical machine 100 comprises the jacket 102, the cooling impeller 1 is placed at a longitudinal end of the jacket 102, the jacket 102 not covering the outer ring 53 of the cooling impeller 1. The jacket 102 is also not pressed against the cooling fins 99 of the stator 9, which then makes it possible to create a third cooling fluid passage between the cooling fins 99 and the jacket 102.

This FIG. 8 also makes it possible to show that the electrical machine 100 comprises openings 19 allowing a circulation of the flow of air from or toward the various cooling fluid passages in the electrical machine 100. The cooling impeller 1 is then situated on a longitudinal end of the stator 9. When the electrical machine 100 comprises two flanges 8, the cooling impeller 1 is fastened to one of the two flanges 8. The cooling impeller 1 is either rotated by the shaft 101 of the electrical machine, or via an actuator independent of the electrical machine 100. In this case, the flange 8 intended to receive the cooling impeller 1 comprises spacers 15 defining, peripherally and transversely to the longitudinal axis L, the openings 19 allowing the circulation of the flow of air in the electrical machine 100. These spacers 15 are also visible in FIG. 9. The opposite flange 8 in turn comprises peripheral openings 19 allowing a circulation of the cooling fluid, for example a flow of air, in a U and thus preventing the mixture from leaving the electrical machine 100. In the case of a closed flange, the latter comprises peripheral openings for the circulation of the flow of air in a U, thus allowing the mixture to form a loop inside the electrical machine 100 to next leave from the side where the cooling impeller 1 is located.

The crowns 2 of the cooling impeller 1 are intended to cooperate with these openings 19. To that end, each ring 5, 51, 52, 53 of the cooling impeller 1 is located in the longitudinal extension of a wall of the electrical machine 100, and more specifically a wall forming the jacket 102 and/or a longitudinal wall 81, 82 of the flange 8.

Figure 10:
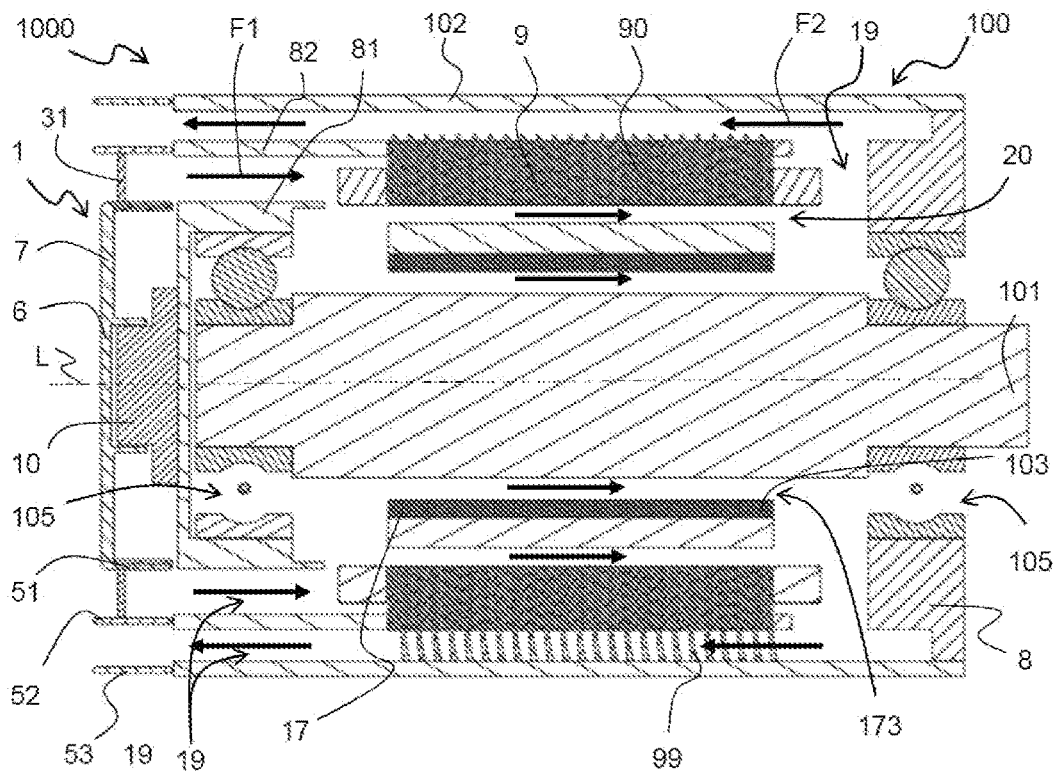
FIG. 10 is a longitudinal sectional view of a first exemplary embodiment of the assembly and in which the cooling impeller is independent of the shaft driving the rotor.

In the example embodiment shown in FIG. 10, the inner ring 51 of the cooling impeller 1 is situated in the longitudinal extension of an inner wall 81 of the flange 8. The intermediate ring 52 of the impeller 1 is situated in the longitudinal extension of an outer wall 82 of the flange 8 and the outer ring 53 is situated in the longitudinal extension of a wall forming the jacket 102. Thus, by the arrangement of the first vanes 31 of the first crown 21, a flow of air circulates in the electrical machine in the first direction F1, i.e., in a direction where the flow is oriented moving away from the cooling impeller 1 and toward the inside of the electrical machine 100. This flow of air F1 for example circulates in the air gap 20 situated between the rotor 103 and the stator 9. This flow of air can also circulate in the second cooling fluid passages formed by the notches 173 arranged through the metal sheets of the rotor 103 thus circulating between the rotor 103 and its shaft 101.

Furthermore, through the arrangement of the second vanes 32 of the second crown 22, a flow of air circulates in the electrical machine 100 in the second direction F2, i.e., in a direction where the flow is oriented toward, or in the direction of, the cooling impeller while being inside the electrical machine 100. This flow of air F2 circulates in this example along the outer face of the stator 9, and more specifically between the cooling fins 99 of the stator 9, and between the cooling fins 99 and the jacket 102.

It is understood that in light of the nature of the cooling fluid, other journeys are possible. In particular, the flow of air can enter the electrical machine by circulating along the outer face of the stator, then return toward the cooling impeller 1 by passing through the air gap 20 and/or through the second cooling fluid passages formed by the notches 173.

Figure 11:
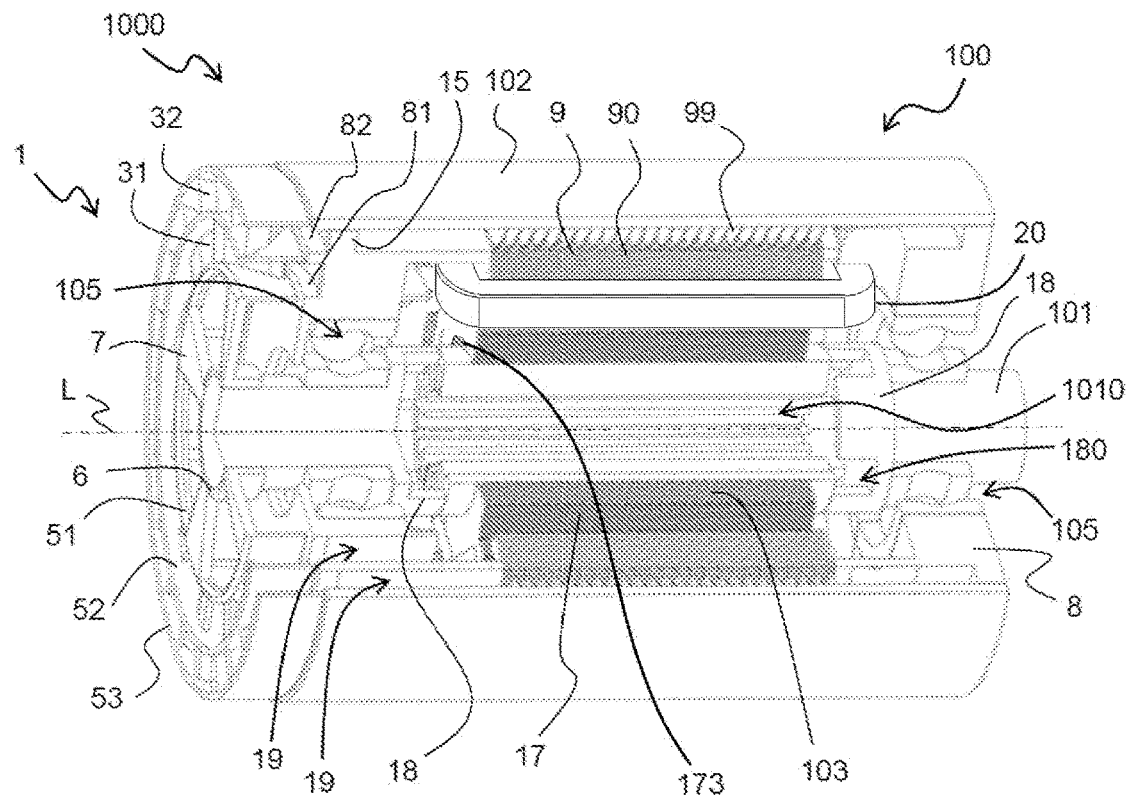
FIG. 11 is a perspective and partial sectional view of a second exemplary embodiment of the assembly and in which the cooling impeller is secured to the shaft driving the rotor.
Figure 12:
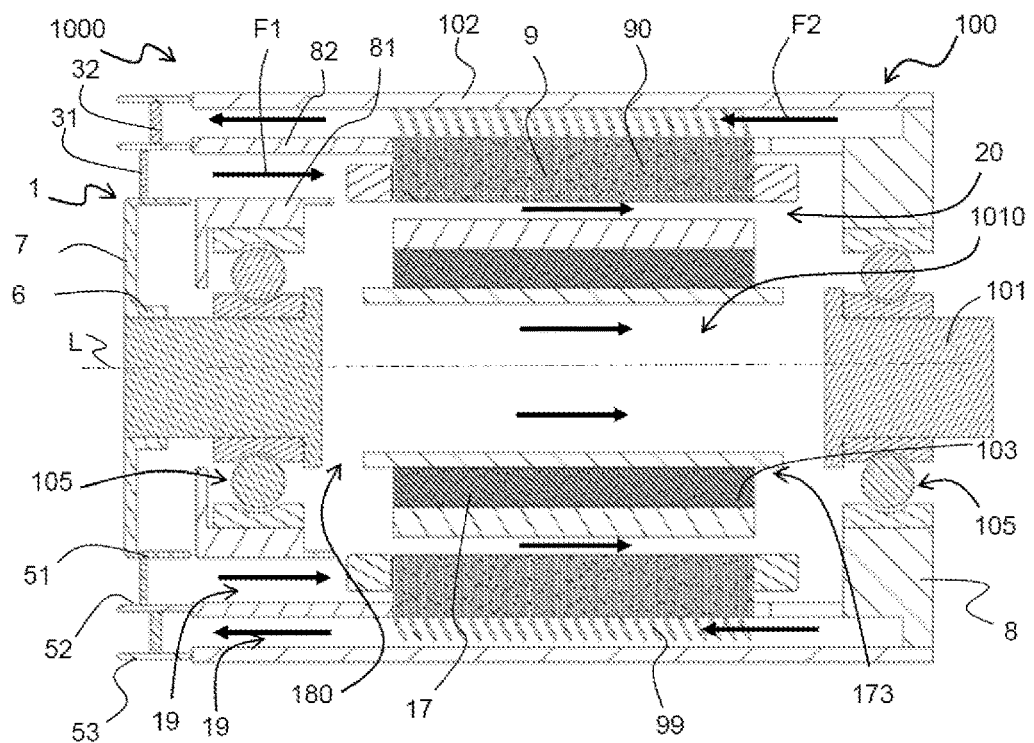
FIG. 12 is a longitudinal sectional view of an assembly according to the second embodiment of the assembly where the impeller is secured to the shaft driving the rotor.

As shown in FIGS. 11 and 12, the shaft 101 rotating the rotor 103 can be hollow in order to create a fourth cooling fluid passage 1010 for the flow of air inside the shaft 101. To that end, the shaft 101 comprises, at each of its ends, a sleeve 18 provided with orifices 180 for the entry or exit of the flow of air. Thus, the flow of air can also circulate inside the hollow shaft 101 and its sleeves 18 and thus cool an inner portion of the rotor.

It will be noted that in FIGS. 7 to 10, the cooling impeller 1 is independent of the electrical machine 100 that it cools, then illustrating a first embodiment of the assembly 1000. More specifically, the cooling impeller 1 is independent of the shaft 101 rotating the rotor 103. To that end, the cooling impeller 1 is configured to be rotated by the electrical actuator 10 independent of the electrical machine 100. Thus, the speed at which the electrical machine 100 rotates does not influence the speed at which the cooling impeller 1 rotates, which advantageously makes it possible to discharge the heat generated by the electrical machine 100 when it rotates at a low speed.

Preferably, the electrical actuator 10 of the cooling impeller 1 is fastened on the flange 8 of the electrical machine 100.

According to a second embodiment shown in FIG. 11 or 12, the cooling impeller 1 is secured to the drive shaft 101 of the rotor 103. The cooling impeller 1 is therefore not rotated by a dedicated electrical actuator, but by the rotation of the shaft 101. The hub 6 of the cooling impeller 1 is then directly connected to the shaft 101 of the electrical machine that bears the rotor 17.

In the exemplary embodiment shown in FIG. 12, a flow of air circulates in the electrical machine 100 in a first direction, i.e., in a direction where the air moves away from the cooling impeller 1 and toward the inside of the electrical machine 100. This flow of air circulates, for example, in the first cooling fluid passages arranged through the rotor 103 via the notches 173 thus cooling between the rotor 103 and its shaft 101. This flow of air can next circulate in the air gap 20 situated between the rotor 103 and the stator 9 or use the third cooling fluid passage situated between the jacket 102 and the fins 99 of the stator 9.

Of course, the description regarding the cooling impeller 1 and the circulation of the fluid in the electrical machine 100 applies both to the first embodiment and the second embodiment of the assembly 1000. The invention described according to its various embodiments and variants makes it possible to obtain a significant performance from an electrical propulsion machine of a vehicle, in particular motor vehicle, while maintaining a limited bulk that makes it possible to position the electrical machine in the vehicle and limit its weight. With an identical bulk or weight, the performance of the electrical machine is increased, since its cooling is strengthened.

Figure 13:
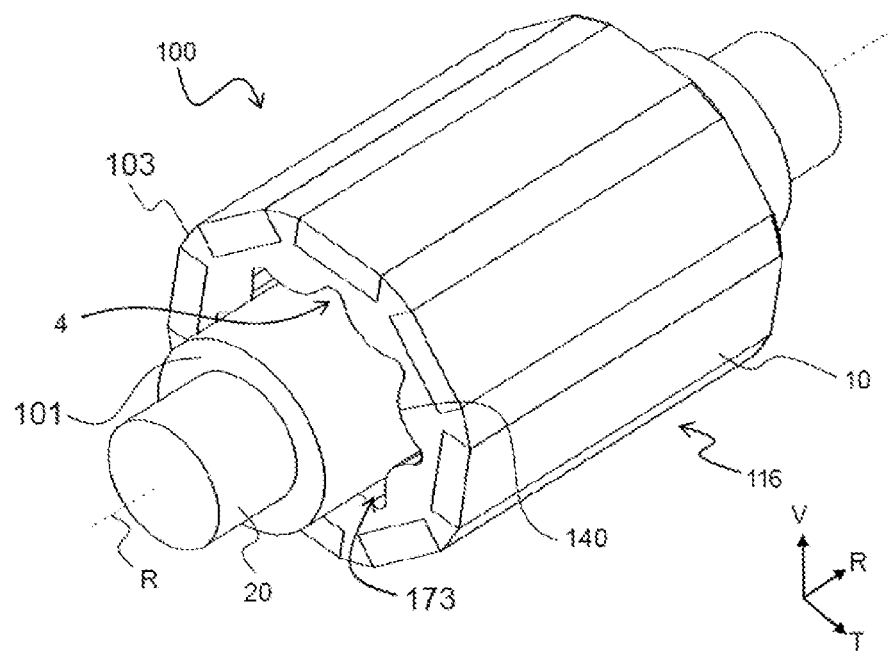
FIG. 13 is a perspective view of an electrical machine, the electrical machine comprising a rotor mounted on a rotatable shaft.
Figure 14:
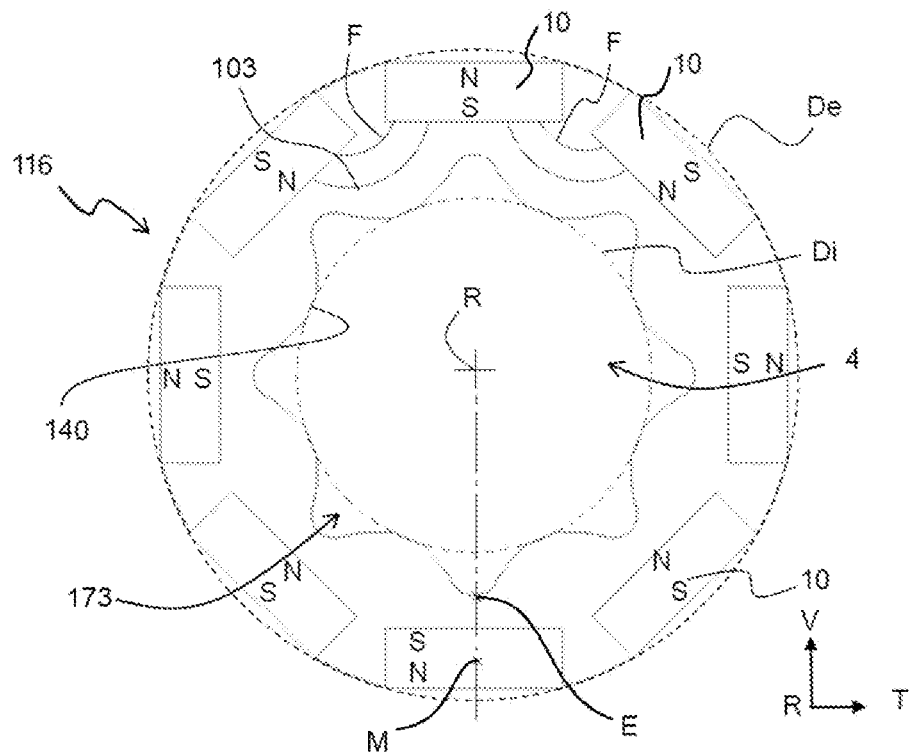
FIG. 14 is a front view of the rotor of the electrical machine illustrated in FIG. 13.

FIGS. 13 and 14 show the electrical machine 100 of an assembly 100 and as shown in the preceding FIGURES, the electrical machine comprising the rotor 103 able to be rotated via the shaft 101 of the electrical machine 100. The shaft 101 has a shoulder in order to create a bearing surface 20 intended to be inserted into bearings of the electrical machine, such as ball bearings.

The rotor 103 has an inner diameter Di and an outer diameter De. The shaft 101 has a diameter substantially close to the inner diameter Di of the rotor 103 and is inserted into a portion of an inner cavity 4 of the rotor 103. This portion of the inner cavity 4 substantially corresponds to the inner diameter Di.

The rotor 103 comprises, in an outer zone 116, exposed toward the outside of the rotor 103 or the assembly 100, a number P of magnetic elements 10. In the exemplary embodiment shown in the FIGURES, the magnetic elements 10 are parallelepiped. The magnetic elements 10 are for example permanent magnets. The rotor 103 can also be wound or molded.

Each of the permanent magnets has a north radial polarity N and a south radial polarity S. In order to implement the rotation of the rotor 103, the polarities between a magnetic element 10 and its neighbor are reversed. In other words, if a given magnetic element 10 has a north outer radial polarity and a south inner radial polarity, then the adjacent magnetic element 10 has a south outer radial polarity and a north inner radial polarity. This arrangement between two adjacent magnetic elements 10 then generates an electromagnetic flux inside the rotor 103. The electromagnetic flux is for example in the form of an arc F of a circle, as partially shown in FIG. 14.

In order not to alter the magnetization of the rotor 103 and while making it possible to provide cooling as well as lightening of the rotor 103, the assembly 1000 and/or the electrical machine 100, a cooling fluid passage is created between the rotor 103 and the shaft 101. To that end, the rotor 103 comprises notches 173. The notches 173 extend longitudinally and parallel to the rotation axis R of the rotor 103. More specifically, the rotor 103 comprises at least two notches 173 delimiting the inner cavity 4, then forming two cooling fluid passages between the rotor 103 and its shaft 101.

The notch 173 is delimited by a wall extending in a plane perpendicular to the rotation axis R. At least part of the wall respects the electromagnetic flux F generated by the magnetic element 10. In other words, the cutting of the notch 173 is done in a portion of the rotor 103 subject to little or no electromagnetic flux F. Thus, due to the presence of the notches 173 forming cooling fluid passages all around the shaft 101 and all along the shaft 101, the invention makes it possible to cool the rotor 103, the shaft 101 and the electrical machine on which they are mounted more efficiently.

In the exemplary embodiment illustrated by the FIGURES, each notch 173 forms a concavity on the inner diameter Di of the rotor 103. More specifically, it is the wall respecting the electromagnetic flux that has a concave circular shape in light of the rotation axis R.

Two adjacent notches 173 are separated from one another by a contact portion 140. The contact portion 140 is configured to bear on the shaft 101. The rotor 103 therefore comprises a plurality of contact portions 140 configured to bear on the shaft 101. These contact portions 140 allow the cooperation and the transmission of the rotational movement between the rotor 103 and the shaft 101. More specifically, the apex of each of the contact portions 140 defines the inner diameter Di of the rotor 103. The contact portions 140 can assume all types of shapes making it possible to provide contact with the shaft 101. Non-limitingly, these contact portions 140 can have a flat shape, be rounded toward the rotation axis or on the contrary rounded in a direction away from the rotation axis so as to adopt the circular shape of the shaft 101. The contact portions 140 can also be pointed.

Figure 15:
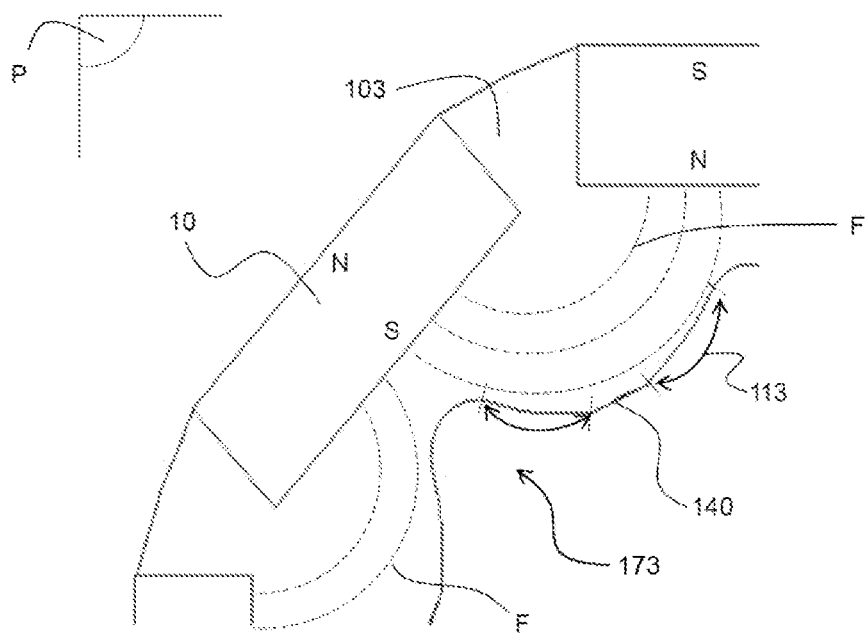
FIG. 15 is an enlargement of part of FIG. 14, where one can see the electromagnetic flux lines.

FIG. 15 shows an enlargement of part of FIG. 14. This portion 113 of the wall delimiting the notches 173, i.e., the wall that extends in the plane P perpendicular to the rotation axis R, here is shown schematically by arrows. This portion 113 of the wall delimiting the notches 173 respects the electromagnetic fluxes F generated by the magnetic elements 10. It is then understood that the wall delimiting the notches 173 allows a circulation of the electromagnetic flux between the magnetic elements 10 without cutting the flux lines F.

In an exemplary embodiment shown in FIG. 15, the rotor 103 comprises a number P of magnetic elements equal to eight and eight adjacent notches 173 separated from one another by eight contact portions 140 configured to bear on the shaft 101. The eight notches 173 and the eight contact portions 140 are situated at a regular angular interval relative to the rotation axis R. More specifically, the notches 173 and the contact portions 140 are regularly spaced apart, here by 45 degrees relative to the rotation axis R. In other words, the angular sector between each notch 173 is constant and the angular sector between each contact portion 140 is also constant, the angular sector being equal to 360/P, where P corresponds to the number of magnetic elements 10 present on the rotor 103. It is also noted that an angular interval between the notches 173 and the contact portions 140 is also constant, the angular interval being equal to 360/2P, where P corresponds to the number of magnetic elements 10 present on the rotor 103, the angular interval here is 22.5 degrees. Thus as shown in the figures, the alternation between the notches 173 and the contact portions 140 forms a sinusoid on the inner diameter Di of the rotor 103.

FIG. 14 also illustrates the relative position of the magnetic elements 10 with the notches 173. Indeed, in this exemplary embodiment, a radius I passing through a center M of the magnetic element 10 also passes through a longitudinal plane of symmetry of the notch 173, here shown by a plane passing through the apex E of the notch 173 and through the radius I of the rotor 103. In other words, the apex E of the notch 173 is radially aligned with the magnetic element 10. It will be noted here that the apex E of the notch 173 is slightly rounded. More generally, one can also say that the radius I passing through a center M of the magnetic element 10 also passes through the point E of the notch 173 furthest from the rotation axis R of the rotor 103.

Alternatively and according to the electromagnetic flux F, the magnetic elements 10 can be aligned with the contact portions 140, thus the notches 173 are situated between the magnetic elements 10. In other words, a radius I passing through a center M of the magnetic element 10 also passes through a longitudinal plane of symmetry of a contact portion 140. Relative to the previous alternative embodiment, the magnetic elements 10 are offset in rotation by an angle of 22.5 degrees.

In the case where the rotor 103 is made by an assembly of stacked rotor sheets, each rotor sheet comprises the notches 173 that have the wall whereof at least a portion 113 respects the electromagnetic flux F in order to create the cooling fluid passages along the shaft 101. The longitudinal section shows that the cooling fluid passages, and therefore the notches 173, extend parallel relative to the rotation axis R.

Figure 16:
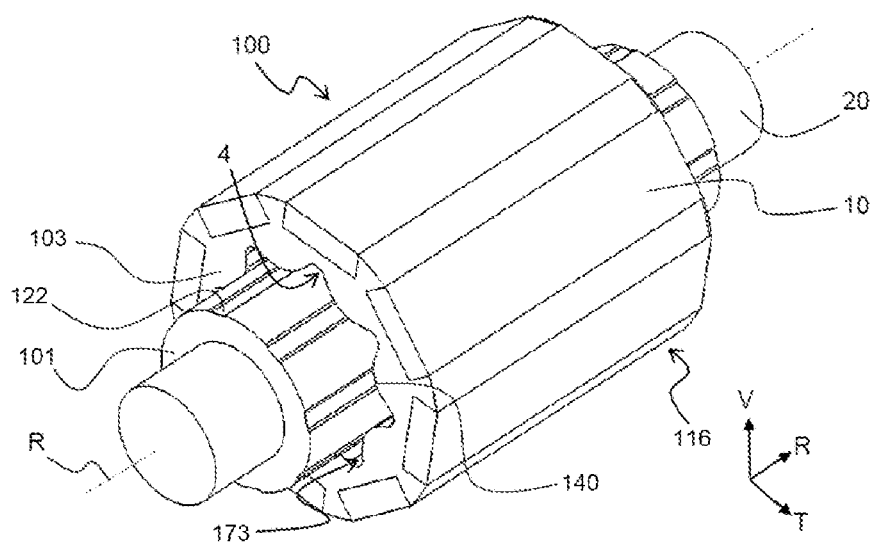
FIG. 16 is a longitudinal sectional view of a variant of the electrical machine illustrated in FIG. 13 and in which the shaft has grooves collaborating with the rotor.

FIG. 16 shows an alternative embodiment of the assembly 100 where the shaft 101 has longitudinal grooves 122 cooperating with the contact portions 140 of the rotor 103. Together, these grooves 122 and the contact portions 140 in particular provide guiding of the rotor 103 on the shaft 101 during the mounting of the parts. Furthermore, the presence of the grooves 122 improves the holding of the rotor 103 on the shaft 101 relative to a smooth shaft 101, without grooves, and make it possible to transmit the torque between the shaft 101 and the rotor 103.

It should be noted that the cooling fluid inserted into the notches 173 of the rotor 103 can be either a liquid or gas. Non-limitingly, in the description above, the cooling fluid is considered to be air.

Of course, the invention is not limited to the examples described above, and many developments can be made to these examples without going beyond the scope of the invention. In particular, the various features, forms, variants and embodiments of the invention can be combined with one another according to various combinations as long as they are not incompatible or mutually exclusive. In particular, all of the variants and embodiments previously described can be combined with one another.

The invention claimed is:

1. An assembly comprising:
an electrical machine comprising:
   a jacket;
   a stator having windings forming coils within said jacket,
   a rotor positioned within said stator,
   a shaft rotating the rotor,
   said electrical machine defining a flow path that is generally U-shaped at least in part; said flow path comprising an entrance and an exit at a first longitudinal end of said electrical machine;
a cooling impeller mounted to said electrical machine at said first longitudinal end, said cooling impeller comprising at least two crowns, including a first crown and a second crown, each crown comprising vanes, said cooling impeller being sized and shaped such that said first crown is aligned with said entrance of said flow path and said second crown is aligned with said exit of said flow path;
wherein the vanes of the first crown of the cooling impeller are arranged so as to generate a circulation of a cooling fluid flow in a first direction, and the vanes of the second crown are arranged so as to generate the circulation of the cooling fluid flow in a second direction, the second direction being opposite the first direction; such that said vanes of said first crown will force cooling fluid externally of said electrical machine into said flow path and said vanes of said second crown will draw cooling fluid from within said electrical machine out of said electrical machine.

2. The assembly according to claim 1, wherein the cooling impeller is independent of the shaft rotating the rotor.

3. The assembly according to claim 2, wherein the cooling impeller is configured to be rotated by an electrical actuator independent from the electrical machine.

4. The assembly according to claim 3, wherein the independent electrical actuator is fastened on a flange of the electrical machine.

5. The assembly according to claim 1 wherein said first crown and second crown are generally coplanar and concentric with each other.

6. The assembly according to claim 1 wherein each of said vanes is in the form of a curved blade.

7. The assembly according to claim 1 wherein each of said vanes has a first rounded and a second pointed end; said vanes being thinner at said second end than at said first end.

8. An assembly comprising:
   an electrical machine comprising:
      a stator having windings forming coils,
      a rotor,
      a shaft rotating the rotor,
      an impeller for cooling the electrical machine, said cooling impeller comprising at least two crowns, including a first crown and a second crown, each crown comprising vanes,
   wherein the vanes of the first crown of the cooling impeller are arranged so as to generate a circulation of a cooling fluid flow in a first direction, and the vanes of the second crown are arranged so as to generate the circulation of the cooling fluid flow in a second direction, the second direction being opposite the first direction, and,
   wherein the shaft of the electrical machine is arranged to be inserted into a portion of an inner cavity of the rotor, said rotor comprising, in an outer zone, at least one magnetic element generating an electromagnetic flux, the inner cavity of said rotor being delimited by at least two adjacent notches separated from one another by a contact portion configured to bear on the shaft, at least part of a wall delimiting the notches respecting the electromagnetic flux generated by the magnetic element.

9. The assembly according to claim 8, wherein the cooling impeller is located on a longitudinal end of the electrical machine.

10. The assembly according to claim 8, wherein the electrical machine comprises a jacket in which the stator and the rotor are placed, the cooling impeller being placed at a longitudinal end of the jacket.

11. The assembly according to claim 8, wherein the wall delimiting the notches extends in a plane perpendicular to a rotation axis of the rotor.

12. The assembly according to claim 8, wherein each notch has a concave curved shape seen from a rotation axis of the rotor, and/or the contact portion has a convex circular shape seen from a rotation axis of the rotor.

13. The assembly according to claim 8, wherein a radius of the rotor passing through a center of the magnetic element also passes through a point of the notch furthest from a rotation axis of the rotor.

14. The assembly according to claim 13, wherein each notch has a rounded apex.

15. The assembly according to claim 14, wherein the shaft comprises grooves for cooperating with the contact portions of the rotor.

16. The assembly according to claim 15, wherein the grooves extend parallel to a rotation axis of the rotor.

* * * * *